United States Patent [19]

Okada et al.

[11] Patent Number: 4,478,541
[45] Date of Patent: Oct. 23, 1984

[54] TOOL MOUNTING

[75] Inventors: Minoru Okada, Yokosuka; Takeo Sone, Yokohama; Shigeru Sakamoto, Hachioji; Yuji Koizumi, Yokohama; Iwao Tsuda, Tokyo, all of Japan

[73] Assignee: Santrade Ltd., Lucerne, Switzerland

[21] Appl. No.: 435,289

[22] Filed: Oct. 19, 1982

[30] Foreign Application Priority Data

Oct. 20, 1981 [JP] Japan .................................. 56-166425

[51] Int. Cl.$^3$ ................................................ B23C 5/26
[52] U.S. Cl. ...................................... 409/232; 407/49; 408/239 A; 409/234
[58] Field of Search ................ 409/234, 232; 279/1 E, 279/91, 8; 407/49, 51, 52; 408/239 R, 239 A

[56] References Cited

U.S. PATENT DOCUMENTS

| | | | |
|---|---|---|---|
| 2,931,659 | 4/1960 | Novkov | 279/8 |
| 3,380,746 | 3/1968 | Benjamin et al. | 279/91 |
| 3,529,843 | 9/1970 | Benjamin et al. | 279/91 |
| 3,663,028 | 5/1972 | King, Jr. et al. | 279/91 |
| 3,743,307 | 7/1973 | Benjamin et al. | 279/91 |
| 3,759,536 | 10/1973 | Bronzini | 279/1 E X |
| 4,204,987 | 5/1980 | McCray et al. | 409/234 |
| 4,322,190 | 3/1982 | Anderson | 409/234 |
| 4,325,664 | 3/1982 | Mori | 409/234 |

Primary Examiner—William R. Briggs
Assistant Examiner—Glenn L. Webb
Attorney, Agent, or Firm—Burns, Doane, Swecker & Mathis

[57] ABSTRACT

An arrangement for quick-mounting and—dismounting of a cutting tool 10. A projection 21 on the machine spindle is fitted into a spacing 33 in a nut element 30 in the cutting tool and by rotation of the nut element 30 axially outwards the projection 21 is forced against an inner wall 39 of the spacing 33, whereby forcing the cutting tool 10 against the machine spindle.

3 Claims, 6 Drawing Figures

TOOL MOUNTING

The present invention relates to an arrangement for quick-mounting and -dismounting of a cutting tool, such as a milling cutter, to a machine spindle, directly, or indirectly such as via an arbor, said cutting tool having a nut element in its centre portion, and said machine spindle being provided with a projection, said nut element and projection being adapted to provide a bayonet coupling between the cutting tool and the machine spindle.

In conventional arrangements for mounting cutting tools to a machine spindle the cutting tool is usually mounted on an arbor which is secured to the machine spindle. The arbor is fixed to the machine spindle by means of bolts and driven inward in axial direction of the spindle by a drawer. The cutting tool is secured to the arbor by means of a fixing bolt which is screwed through the cutting tool into the machine spindle.

A disadvantage of such an arrangement is that whenever the cutting tool is to be mounted or dismounted it is necessary to screw in and out, respectively, the bolt. This requires a lot of time. Another disadvantage of this arrangement is that, in order to remove the cutting tool from a vertical type milling machine, the fixing bolt has to be unscrewed with one hand while the other hand supports the cutting tool. This is troublesome and somewhat dangerous, since a momentary lack of attention can cause the cutting tool to slip out of the fingers of the worker.

U.S. Pat. No. 4325664 discloses an arrangement of basically the same type as the present invention. In this prior art device the cutting tool may be attached to and detached from the arbor without requiring removal of the bolt. This device, however, requires the use of two guiding pins which limits the contact surface between the nut element and projection, whereby jeopardizing the clamping security.

The object of the present invention is to provide a tool mounting in which the cutting tool is quickly attachable and detachable while ensuring a satisfactory clamping security.

The above and other objects of the invention are attained by giving the invention the characterizing features stated in the appending claims.

The invention is described in detail below with reference to the accompanying drawings in which one embodiment of the invention is shown by way of example. It is to be understood that this embodiment is only illustrative of the invention and that various modifications thereof may be made within the scope of the claims.

Figure 1:
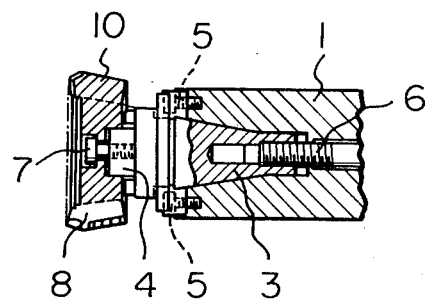
FIG. 1 is a sectional side view of a conventional mounting arrangement.

In the conventional mounting arrangement shown in FIG. 1 the cutting tool 10 is secured on a central projection 4 on an arbor 3 extending coaxially therewith. The cutting tool 10 is provided with cutting inserts 8 and is secured to the arbor 3 by means of a bolt 7. The arbor 3 is secured to the machine spindle 1 by means of a drawbar 6 and prevented from rotating relative thereto by means of keys 5.

Figure 2:
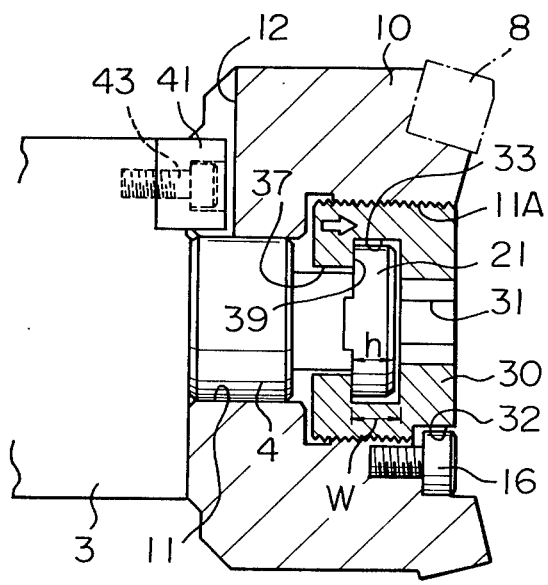
FIG. 2 is a side view partly in section of an arrangement according to the present invention.
Figure 4A:
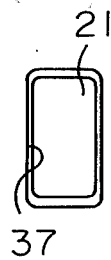
FIGS. 4A and 4B show the locking members in the bayonet coupling in the mounting and dismounting position and the locking position respectively.
Figure 4B:
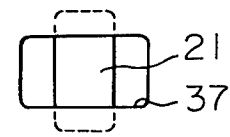

Referring now to FIG. 2, an arrangement for quick-mounting and dismounting of a cutting tool 10 in accordance with the present invention includes an arbor 3, a projection 21 formed at an outermost portion 4 of the arbor 3 coaxially therewith, a nut element 30 with a peripheral thread which meshes with an inner thread 11A of the cutting tool 10 and a stop member 16 contacting an arc-shaped groove 32. The arbor 3 is in conventional manner secured to a machine spindle, not shown. The cutting tool 10 is provided with cutting inserts 8 and a center hole 11 adapted to receive the outermost portion 4. A key 41 fixed to the arbor 3 by means of a fixing bolt 43 is fitted into a key way 12 formed in the external part of the cutting tool 10 facing the arbor 3. As shown in FIGS. 4A and 4B the projection 21 has a non-circular cross section, preferably rectangular, and a height h, see FIG. 2.

The nut element 30 is provided with a non-circular, preferably rectangular, opening 37 in the side surface of the nut element 30 facing the arbor 3. The opening 37 is turning into an enlarged spacing 33, in the nut element 30, said spacing having a width w. The opening 37 has a profile of equal shape as and somewhat larger than the profile of the projection 21 so that the projection 21 can be fitted into the opening 37. The external diameter D of the spacing 33 is larger than the rotational diameter formed when the projection 21 is rotated. This means that the projection 21 is able to rotate in the spacing 33 without hitting its wall. There is also provided an axial clearance between the projection 21 and the spacing 33 due to the fact that the width w is slightly larger than the height h. An axially inner wall 39 of the spacing 33 is adapted to provide a shoulder for the projection 21. Upon being brought through the opening 37 into the spacing 33, the projection 21 is retained within the spacing 33 by rotating the nut element 30 relative to the projection 21.

An axially outer side surface of the nut element 30 has a non-circular, preferably hexagonal, recess 31 adapted to receive a wrench, not shown, having a non-circular, preferably hexagonal, operating portion. When the nut element 30 is screwed axially outwards, it moves in the direction of the arrow in FIG. 2, and due to its cooperation with the projection 21 it causes the cutting tool 10 to move towards and finally against the arbor 3. To release the cutting tool 10 the nut element 30 is screwed axially inwards.

Figure 3:
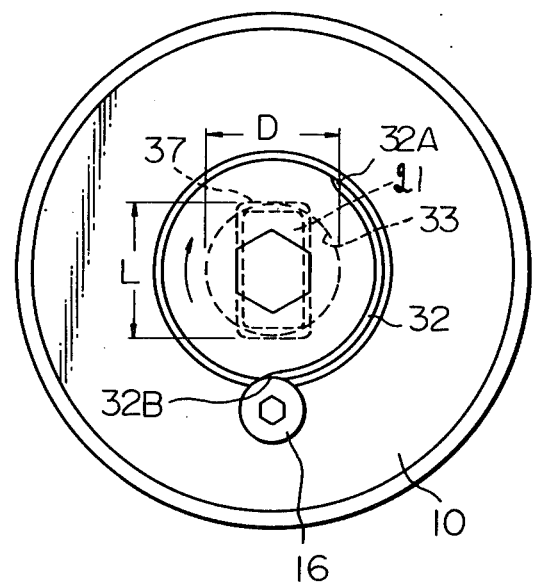
FIG. 3 is a partial front view of the device shown in FIG. 2.

Referring now to FIG. 3, the arc-shaped groove 32 is formed on a part of the periphery of the nut element 30 to restrict the rotation of the nut element 30 relative to the cutting tool 10. Restriction of rotation is obtained by means of stop member 16 in form of a bolt which is fixed to the cutting tool 10 at a position corresponding to the groove 32. The stop member 16 is partially projected into the groove. The nut element 30 is able to move within the range of the groove 32 until the stop member 16 either contacts the end 32A or the end 32B of the groove. This prevents the nut element 30 from being screwed out of the cutting tool 10. In the illustrated embodiment left hand threads are machined on the external surface of the nut element 30. As shown in FIG. 3, the stop member 16 contacts the end 32B of the groove 32 and works as a stopper in the position making it possible to mount and dismount the tool to and from, respectively, the arbor. The stop member 16 has to be removed when the nut element 30 is to be removed from the cutting tool 10. When the cutting tool is to be secured to the arbor 3, the nut element 30 is rotated in clockwise direction as illustrated by an arrow in FIG. 3.

FIGS. 4A and 4B show the mounting and dismounting position and locking position, respectively of the projection 21 in relation to the opening 37. The projection 21 and the opening 37 may take any configuration, except circular, provided the projection can pass through the opening. The locking position in FIG. 4B shows that after a relative rotation of the opening 37 of the nut element 30 a large contact surface between the projection 21 and the inner wall 39 of the nut element 30 is achieved.

This large contact surface prevents the cooperating members from being distorted or bent due to the arising axial forces and ensures a satisfactory clamping security of the cutting tool 10.

Figure 5:
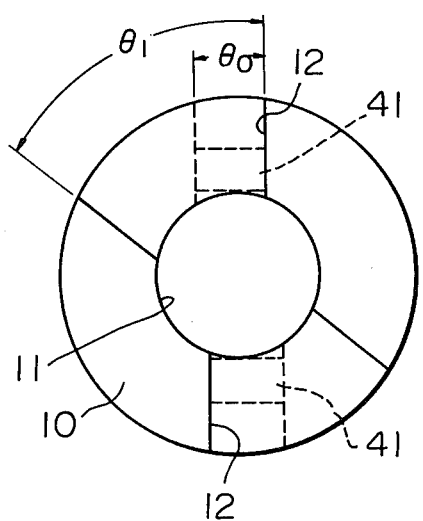
FIG. 5 is a near view of the cutting tool shown in FIG. 2.

Referring now to FIG. 5, the cutting tool 10 having a central hole 11 is formed with key ways 12 which are adapted to receive keys 41 attached to the arbor 3. In comparison with conventional arrangements the width of the key way 12 is widened in such a manner that the key way includes an angle $\theta_1$. Due to such a widening of the key way the cutting tool 10 might rotate relative to the arbor 3 within the range of the width of the key way. Preferably, the angle $\theta_1$ should be below 90°. In conventional arrangements, when the machine is of the vertical type, for example a slotting machine or a vertical milling machine, the cutting tool must be manually held against the arbor until the nut element is rotated to locking position. In conventional arrangements the width of the key way corresponds to the width $\theta$ of the key 41.

Alternatively the key way may be formed in the arbor 3 to receive a key fixed to the cutting tool.

In order to mount the cutting tool 10 on the arbor 3, the central hole 11 is first passed over the projection 21. The cutting tool 10 is then moved on the arbor portion 4 until the surface of the tool facing the arbor 3 comes into contact with the arbor as shown in FIG. 2. The projection 21 now fits in the spacing 33 and the key 41 is placed at one side of the key way 12.

Then the nut element 30 and the cutting tool 10 are rotated by hand as a unit through a first angle $\theta$, not illustrated, relative to the projection 21, until the key 41 contacts the other side of the key way 12. The angle $\theta$, which depends on the length of the key 41, is smaller than the angle $\theta_1$. The cutting tool 10 is now prevented from being axially removed from the machine spindle by means of the projection 21. The nut element 30 is then rotated, in the same direction as mentioned above and shown in FIG. 3, relative to the projection 21 and the cutting tool 10 through a second angle until the inner wall 39 of the nut element 30 is forced against the projection 21. Hence, the cutting tool 10 is securely clamped to the arbor 3.

In order to dismount the cutting tool from the machine spindle, the above sequences are only to be reversed.

The main advantage of an arrangement according to the present invention is that the cutting tool can be mounted to and dismounted from the machine spindle in an extremely simple manner without the need of removing a bolt while simultaneously providing a high clamping security.

While a preferred embodiment of the present invention has been disclosed, it is to be understood that it has been described by way of example only and that various modifications may be made within the scope of the claims. For instance, the cutting tool might be secured directly to the machine spindle without an intermediary arbor.

We claim:
1. An assembly comprising:
   a cutting tool having a center aperture with internal threads,
   a nut element having external threads rotatably connectible to said internal threads in the axial direction of said aperture,
      said nut element including a rearwardly facing opening,
   a holder having a forwardly extending stationary projection,
      said projection and said opening together defining a bayonet coupling wherein said nut element is insertable rearwardly over said projection and is rotatable relative thereto to lock said nut element against forward axial removal from said projection,
   said nut element including means for receiving an implement for rotating said nut element about an axis of rotation in a direction relative to said tool such that said nut element tends to travel axially forwardly and said tool tends to travel axially rearwardly, said nut element abutting said stationary projection to be restrained against axially forward movement such that said tool travels axially rearwardly against said holder in response to rotation of said nut element in said direction.

2. Apparatus according to claim 1, wherein said nut includes a forwardly facing surface having a non-circular recess therein which is coaxial with said axis of rotation of said nut, said recess defining said means for receiving an implement for rotating said nut.

3. Apparatus according to claim 1, wherein said nut element includes a peripheral groove having two ends stops, a stop member being removably securable to said tool and receivable within said groove to permit restricted rotation to said nut element relative to said tool, said groove including a surface which is opposed by said stop member to prevent said nut from being screwed-out of said tool while said stop member is secured to said tool.

* * * * *